United States Patent [19]

Anstin et al.

[11] 3,757,941

[45] Sept. 11, 1973

[54] DOCUMENT AND INFORMATION STORAGE AND RETRIEVAL SYSTEM

[75] Inventors: Wayne D. Anstin, Cupertino; Joseph E. Byrne, Los Altos; Gilbert F. Clifford, Los Altos Hills; Robert W. Henkel, Cupertino; Arthur W. Odell, Atherton; Lawrence T. Quaglia, Sunnyvale; Donald F. Smith, Palo Alto, all of Calif.

[73] Assignee: Varian Adco, Palo Alto, Calif.

[22] Filed: Nov. 3, 1971

[21] Appl. No.: 195,088

[52] U.S. Cl. ................ 209/80.5, 209/111.7, 353/25
[51] Int. Cl. ........................................ B07c 5/342
[58] Field of Search ............................ 353/25, 27; 209/80.5, 111.7; 355/40, 41; 235/61.11 E; 340/146.3

[56] References Cited

UNITED STATES PATENTS 3,176,279 3/1965 Lin .......................... 209/80.5 UX
3,288,024 11/1966 Cronquist ...................... 353/25 X

*Primary Examiner*—Richard A. Schacher
*Attorney*—Paul D. Flehr, Aldo J. Test et al.

[57] ABSTRACT

Documents or information in the form of microfilm, microfiche or other permanent form are mounted on rectangular frames or carriers which are edge coded. A plurality of carriers are stored in a random manner in spaced slots arranged in one or more elongated storage bins with the bins arranged side by side. A bridge which carries a random document locator and retrieve and refile head assembly is adapted to move across the bins to a selected bin. The document locator, retrieve, and refile head assembly then moves along the bridge over the selected bin to store or retrieve selected carriers. During location, the coded edges are scanned to locate the desired carrier; an electrical control starts the retrieve cycle to pick up the carrier having the desired document and deposits the carrier on a conveyor system for transport to an output location where the document or information is presented to a video camera and the signal from the camera may be transmitted to a remote video terminal for viewing. The carrier is then returned to the document refile assembly along the same conveyor system where it is picked up and refiled by the head assembly.

27 Claims, 21 Drawing Figures

WAYNE D. ANSTIN, JOSEPH E. BYRNE,
GILBERT F. CLIFFORD, ROBERT W. HENKEL,
ARTHUR W. ODELL, LAWRENCE T. QUAGLIA, & DONALD F. SMITH.
INVENTORS

BY Flehr, Hohbach, Test,
Albritton and Herbert.
ATTORNEYS

WAYNE D. ANSTIN, JOSEPH E. BYRNE, GILBERT F. CLIFFORD,
ROBERT W. HENKEL,
ARTHUR W. ODELL, LAWRENCE T.
QUAGLIA, & DONALD F. SMITH.
*INVENTORS*

BY Flehr, Hohbach, Test,
Albritton and Herbert
ATTORNEYS

WAYNE D. ANSTIN,
JOSEPH E. BYRNE, GILBERT F. CLIFFORD, ROBERT W. HENKEL, ARTHUR W. ODELL, LAWRENCE T. QUAGLIA, & DONALD F. SMITH.
INVENTORS

BY Flehr, Hohbach, Test, Albritton and Herbert
ATTORNEYS

WAYNE D. ANSTIN,
JOSEPH E. BYRNE,
GILBERT F. CLIFFORD,
ROBERT W. HENKEL,
ARTHUR W. ODELL,
LAWRENCE T. QUAGLIA
& DONALD F. SMITH.
INVENTORS

BY Flehr, Hohbach, Test, Albritton and Herbert
ATTORNEYS

WAYNE D. ANSTIN,
JOSEPH E. BYRNE,
GILBERT F. CLIFFORD,
ROBERT W. HENKEL,
ARTHUR W. ODELL,
LAWRENCE T. QUAGLIA,
& DONALD F. SMITH.
INVENTORS

BY *Flehr, Hohbach, Test, Albritton and Herbert*

ATTORNEYS

WAYNE D. ANSTIN,
JOSEPH E. BYRNE,
GILBERT F. CLIFFORD,
ROBERT W. HINKEL,
ARTHUR W. ODELL, LAWRENCE T. QUAGLIA & DONALD F. SMITH.
INVENTORS.

BY Flehr, Hohbach, Test, Albritton and Herbert
ATTORNEYS

WAYNE D. ANSTIN,
JOSEPH E. BYRNE,
GILBERT F. CLIFFORD,
ROBERT W. HENKEL,
ARTHUR W. ODELL,
LAWRENCE T. QUAGLIA,
& DONALD F. SMITH.
INVENTORS

BY Flehr, Hohbach, Test, Albritton and Herbert

ATTORNEYS

WAYNE D. ANSTIN,
JOSEPH E. BYRNE,
GILBERT F. CLIFFORD,
ROBERT W. HENKEL,
ARTHUR W. ODELL,
LAWRENCE T. QUAGLIA,
& DONALD F. SMITH.
*INVENTORS*

BY Flehr, Hohbach, Test, Albritton and Herbert

ATTORNEYS

WAYNE D. ANSTIN,
JOSEPH E. BYRNE,
GILBERT F. CLIFFORD,
ROBERT W. HENKEL,
ARTHUR W. ODELL,
LAWRENCE T. QUAGLIA,
& DONALD F. SMITH.
INVENTORS

BY

ATTORNEYS

WAYNE D. ANSTIN,
JOSEPH E. BYRNE,
GILBERT F. CLIFFORD,
ROBERT W. HENKEL,
ARTHUR W. ODELL,
LAWRENCE T. QUAGLIA,
& DONALD F. SMITH.
INVENTORS

BY Flehr, Hohbach, Test, Albritton and Herbert

ATTORNEYS

Patented Sept. 11, 1973

3,757,941

12 Sheets-Sheet 11

WAYNE D. ANSTIN,
JOSEPH E. BYRNE,
GILBERT F. CLIFFORD,
ROBERT W. HENKEL, ARTHUR
W. ODELL, LAWRENCE T.
QUAGLIA & DONALD F. SMITH
INVENTORS.

BY Flehr, Hohbach, Test,
Albritton and Herbert
ATTORNEYS

WAYNE D. ANSTIN,
JOSEPH E. BYRNE,
GILBERT F. CLIFFORD,
ROBERT W. HENKEL,
ARTHUR W. ODELL,
LAWRENCE T. QUAGLIA,
& DONALD F. SMITH.
*INVENTORS*

BY Flehr, Hohbach, Test, Albritton and Herbert
ATTORNEYS

DOCUMENT AND INFORMATION STORAGE AND RETRIEVAL SYSTEM

BACKGROUND OF THE INVENTION

This invention relates generally to a document and information storage and retrieval system and more particularly to an automated system for filing, storing, retrieving, displaying, copying, refiling and updating documents and information mounted on carriers as, for example, in the form of microfilm or microfiche.

Document and information storage systems using coded cards or carriers are known in the art. The cards or carriers are coded, stored and retrieved in a variety of ways. Such systems have employed face coding of carriers whereby the face or a portion of the face of each card or carrier must be scanned in order to select the desired carrier. To conserve space, the cards or carriers are packed in such a manner that they are touching one another in face to face relationship. This requires that they be separated in order to scan the coded face and to allow the selected carrier to be removed. Another system employs cards which are stacked in face to face relationship with the cards having an edge code which can be read by a magnetic or photoelectric transducer. The cards are then selected by pushing the cards from the stack. A mechanism is provided for refiling the cards at the front end of the stack. Other systems utilize roll microfilm and strip microfilm which is fed past a reader or copier. Still another system employs video tape recording.

In copending application, Ser. No. 7,884, filed Feb. 2, 1970, entitled "Document and Information Storage and Retrieval System" now U.S. Pat. No. 3,697,680, there is described a system in which documents and information in the form of microfilm or other permanent form are mounted in edge coded frames or carriers. The carriers are stored in one or more elongated bins which are arranged side by side. A carriage including a sensor and ejecting head is moved to and then along a selected bin until the desired document is sensed, at which time movement is arrested and the carrier is ejected to an underlying belt and transported to a display station where it can be displayed, printed or copied. Thereafter, the carriers are returned to the selector head where they are temporarily stored. The head then moves along the bin and returns the carriers to open slots or positions in the respective bins.

OBJECTS AND SUMMARY OF THE INVENTION

It is an object of the present invention to provide an improved document and information storage and retrieval system.

It is another object of the invention to provide a document storage and retrieval system which, upon command, automatically, rapidly and accurately finds documents stored in a random manner in bins, picks up the documents and delivers them to a transport system which transports the document to a display station where the document is displayed, copied and the like, and then the document is returned via the same transport system to the bin.

It is another object of the present invention to provide a document storage and retrieval system in which the documents can be easily updated.

It is a further object of the present invention to provide an improved locating, retrieving and refile assembly for document storage and retrieval systems.

The foregoing and other objects of the invention are achieved by a system which includes a plurality of elongated storage bins disposed side by side and each including means for receiving and holding a plurality of coded document carriers in spaced face to back relationship. A bridge is adapted to move to and span a selected bin. The bridge includes an endless belt to transport carriers along the side of the bridge to the end of the bin. The bridge carries a locating, retrieving and refiling head assembly which includes means for reading the code on the edge of the carriers, transmitting the signal to an electrical control circuit which arrests movement of the head assembly when a selected carrier is found. The head picks up the carrier and delivers it to the endless belt. A transition means is disposed at the end of the belt to receive the carrier and deposit the carrier on a transverse belt which delivers the carrier to the output station. The carriers are then applied to a display system which includes means for making hard copy or for duplicating the information or for transmitting the stored information. Upon completion of a reading, display or copying operation, the carriers are returned to the head assembly via the same conveyor system. The head assembly then picks up the carriers and refiles them into the bin.

DESCRIPTION OF PREFERRED EMBODIMENT

General Description

Figure 1:
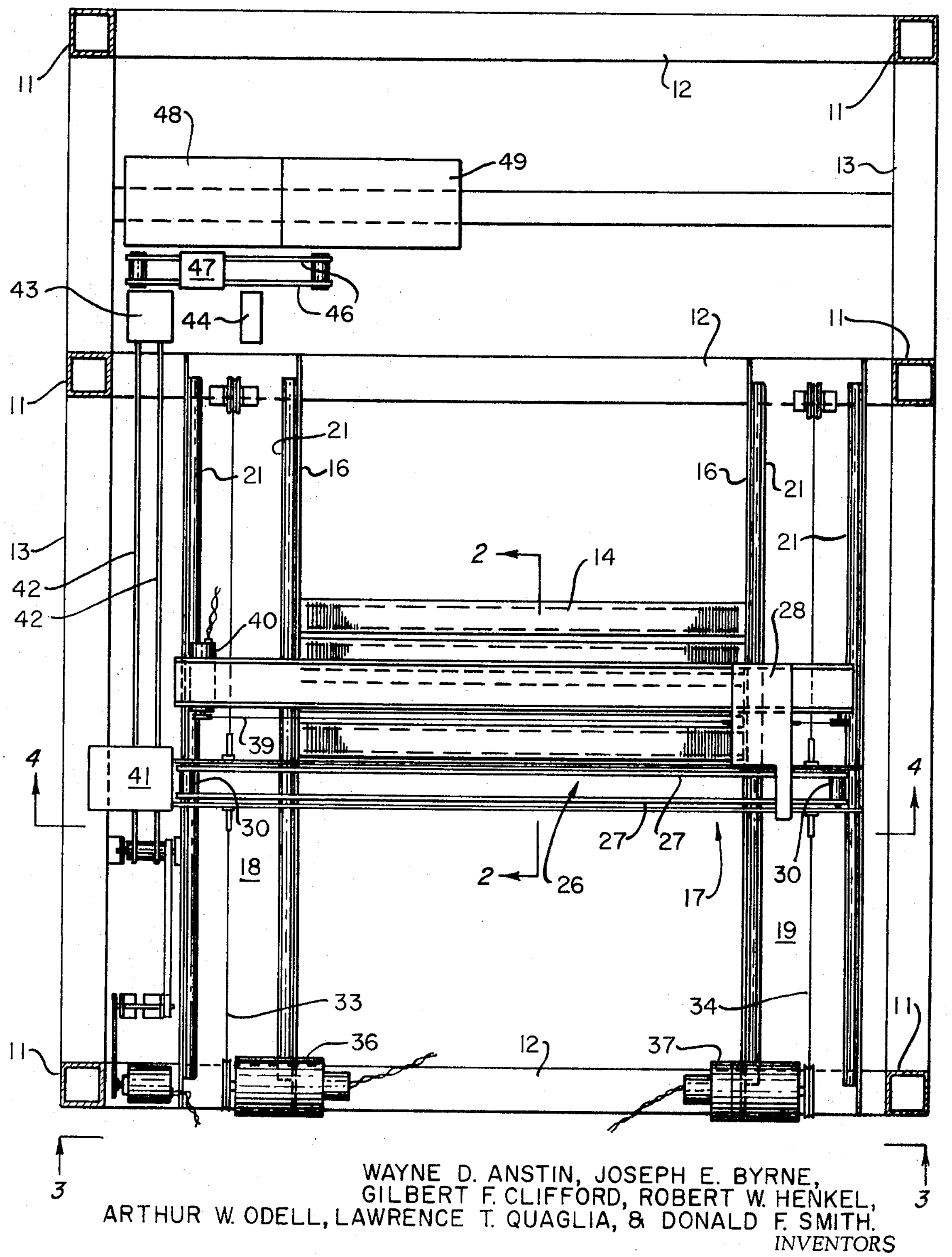
FIG. 1 is a plan view of a storage and retrieval system in accordance with the invention.
Figure 2:
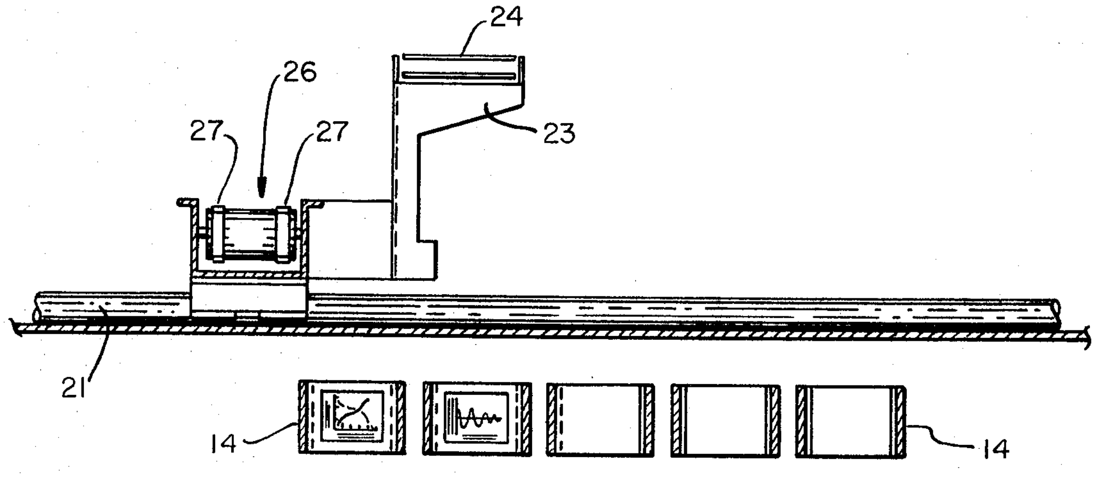
FIG. 2 is a sectional view taken along the line 2—2 of FIG. 1 showing the bridge, longitudinal transport belts and a plurality of bins.
Figure 3:
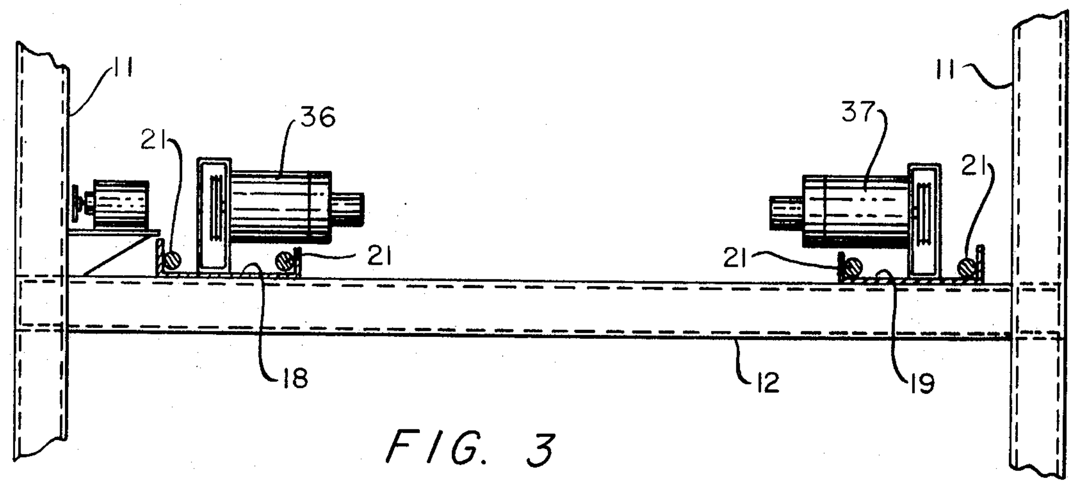
FIG. 3 is a side elevational view taken along the lines 3—3 of FIG. 1 showing the bridge drive means and the transverse bridge rails on which the bridge rides.
Figure 4:
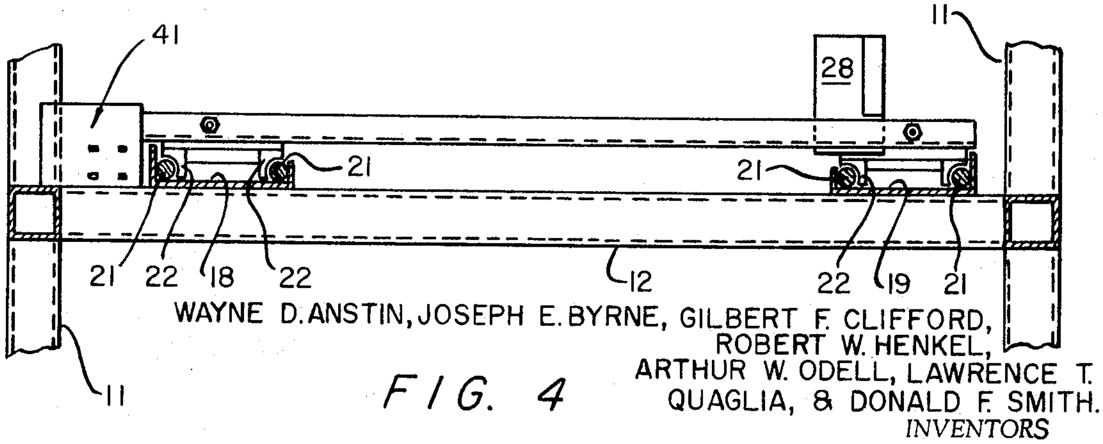
FIG. 4 is a sectional view taken along the line 4—4 of FIG. 1 including a side elevational view of the bridge and the sensing and pickup mechanism.

The apparatus comprises a supporting frame including a plurality of spaced uprights 11, FIGS. 1–4, to which are suitably attached longitudinal support members 12 and transverse support members 13. A plurality of storage bins 14 are supported by spaced bin supports 16 which span between the spaced longitudinal support members 12. A bridge designated generally by the reference numeral 17 is adapted to move transversely across the apparatus over the storage bins 14. The bridge is adapted to ride upon spaced rails 18 and 19 disposed at the two ends of the apparatus. The rails each include a pair of spaced rail members 21 engaged by gliders 22 which support the bridge at each end.

The bridge includes a platform 23 for supporting a flat folding electrical cable assembly 24 which supplies energy to the locate, retrieve and refile head assembly to be presently described. In addition, the bridge carries a longitudinal carrier conveyor 26 which comprises spaced belts carried on rollers 30 one of which is driven by a drive motor (not shown).

Figure 5:
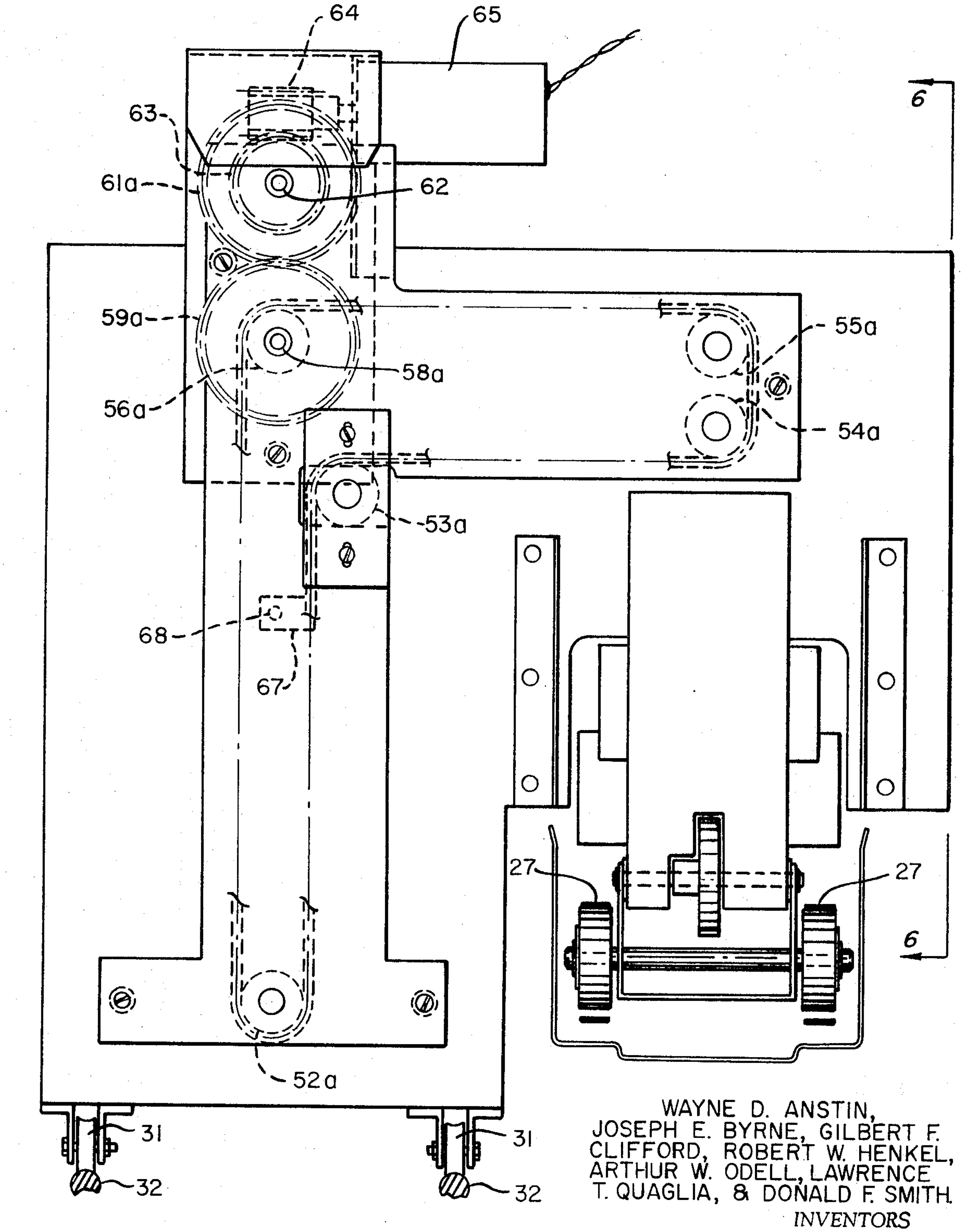
FIG. 5 is an enlarged front view of the pickup and refile head.

In addition, a locate, pickup and refile head assembly 28 is carried by the bridge for longitudinal movement therealong. The assembly 28 includes lower wheels or rollers 31, FIG. 5, which ride along spaced rails 32 (FIG. 5) carried between the top edge of adjacent bins 14. The bridge assembly includes a short section of rail (not shown) which moves with the bridge and which is adapted to register with the ends of the bin rails whereby the head assembly in its home position rests on the short section of rail and can move transversely across the apparatus with the bridge. Once the selected bin is located and the bridge motion is stopped, the head can then roll from the movable section of the rail onto the fixed rail portions between adjacent bins. It is then supported and guided along the bins for locating carriers as will be presently described.

The bridge is moved by means of spaced endless cables 33 and 34 which are driven by servo motors 36 and 37. The motors are electrically controlled to move the bridge along the rails in alignment with the bins. A system for controlling the motors is hereinafter described. The head 28 is moved along the bin rails and bridge by means of an endless cable 39 driven by motor 40.

The head includes an optical sensor which senses the code on the individual carriers and provides an electrical signal representative of the code. Associated circuitry compares the signal to the signal for a desired carrier. When the desired carrier is located, head movement is arrested. A suitable document locator is described in copending patent application, Ser. No. 195,272, filed Nov. 3, 1971.

When the desired carrier is located, it is lifted from the bins by the pickup head and delivered to the longitudinal belts which move the carriers to a transition mechanism 41 mounted on the end of the bridge for movement with the bridge. The transition mechanism receives the carriers, lowers and places them on the transverse belts 42 which carries them across the machine and delivers them to an uprighting mechanism 43. The mechanism 43 places the carriers in an upright position, delivers them to a display storage unit 47 which is moved by belts 46 to cooperate with an eject mechanism 44 and a carrier hold mechanism 48 associated with the display apparatus to present the carriers to a television camera 49.

Thus, briefly, operation is as follows: The bridge moves across the apparatus to a selected bin, stops with the movable portion of the bridge rail adjacent the bin rail, the head assembly is then moved longitudinally along the bins until a selected carrier is reached, at which time movement of the head is stopped, the selected carrier is picked up, laid on the longitudinal belt, transported along the belt to the transition mechanism 41 along belts 42 to the uprighting mechanism 43 and is presented at the output location where it is available for copying or viewing. After all the carriers in the display storage unit 47 have been viewed, the display storage unit 44 is moved back to a position adjacent the uprighting mechanism and the carriers are ejected one at a time back onto the belts 42 to the transition mechanism 41 and onto belts 27. The head accepts the carriers and refiles them one at a time into open slots in the storage bins.

Locate, Retrieve and Refile Head Assembly

The locator portion of the head and associated electronic circuitry for locating a carrier is more completely described in copending application, Ser. No. 19,272, filed Nov. 3, 1971, entitled "Random Document Locator." The head moves along a selected bin and sequentially optically senses the identifying edge codes of the carriers. The optically sensed codes are compared with a predetermined code to provide a compared indication. The retrieving means, to be presently described, are also mounted on said carriage for movement therewith and are responsive to the compared indication for retrieving the located carrier.

Figures 8, 9, 10:
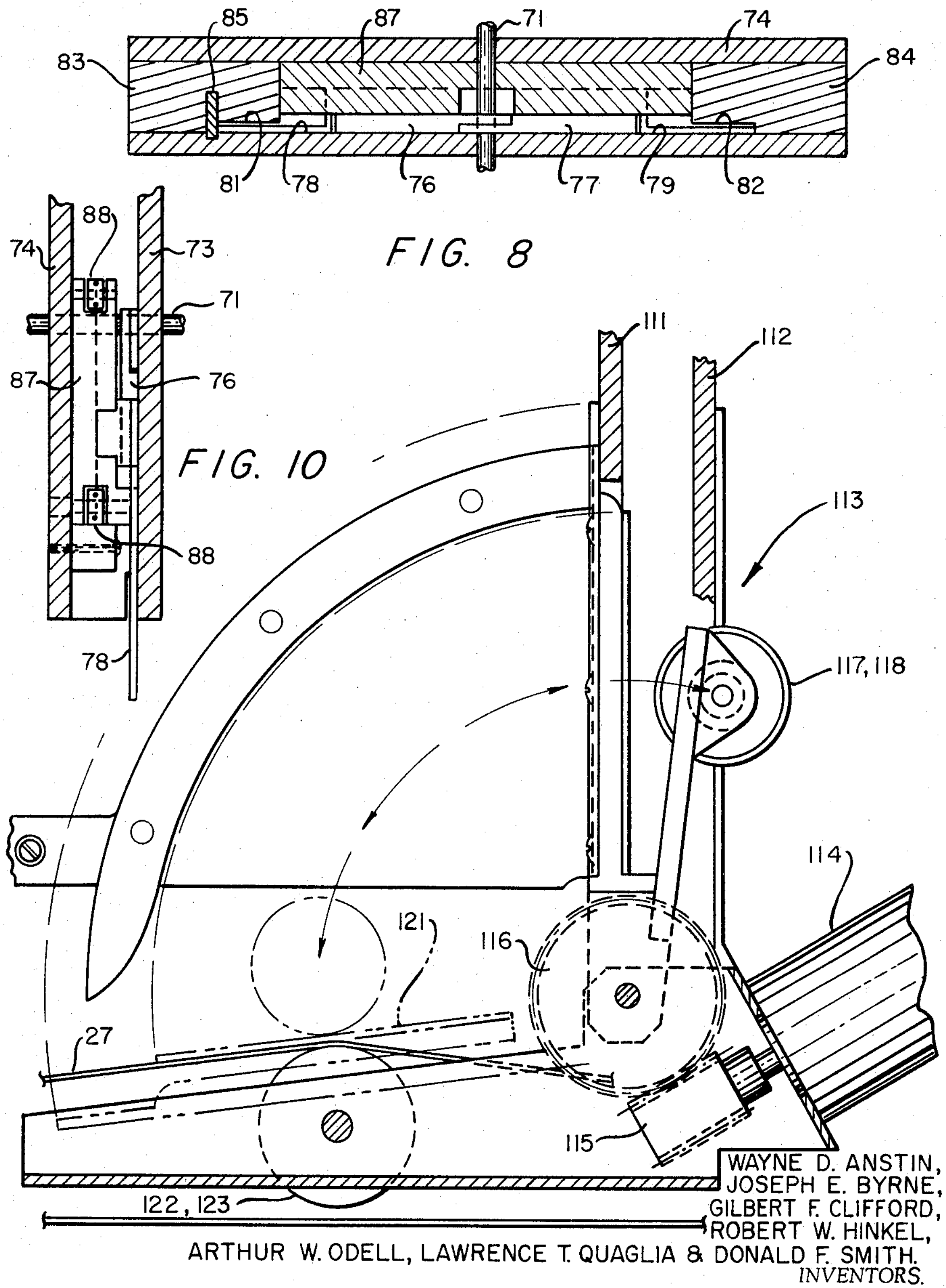
FIG. 8 is a sectional view taken along the line 8—8 of FIG. 7.
FIG. 9 is a sectional view taken along the line 9—9 of FIG. 7.
FIG. 10 is a sectional view taken along the line 10—10 of FIG. 7.

The retrieve mechanism is shown more clearly in FIGS. 5–10. The mechanism comprises spaced endless chain belts **51*a*, 51*b* at the front and back of the mechanism. These chains are carried and guided by means of sprocket idlers 52*a*, 52*b*; 53*a*, 53*b*; 54*a*, 54*b* (not shown); 55*a*, 55*b* (not shown); and by drive sprocket 56*a*, 56*b*. The various sprockets are carried on shafts which are supported by front and back plates 57*a* and 57*b*. The end of the shafts 58*a* and 58*b* associated with the drive sprockets 56*a*, 56*b* carry spur gears 59*a*, 59*b* which are engaged by spur gears 61*a*, 61*b* mounted on the ends of shaft 62. The shaft 62 carries a worm wheel gear 63 engaged by the worm 64 driven by a drive motor 65. An arm 67 is firmly secured to the belt to move with the belt as the belt is driven. The hole 68 formed on arm 67, which engages the associated pin, is on the same center as the shaft 69 of idlers 52*a*, 52*b*. In this way, the drive arm 67 is moved around the sprocket idler 52*a*. The arm 67 engages the pin 71, FIG. 6, which, in turn, travels in elongated slot 72 formed in the front and back guide covers 73, 74. Links 76 and 77 are carried by the pin and engage pickup arms 78 and 79, respectively. Referring to FIGS. 8 and 10, the arms are shown as riding in slots 81 and 82 formed on opposite sides of guides 83 and 84 secured between the front and back covers 73 and 74**. A stainless steel guide 85 is inserted at the end of one of the slots and serves to prevent opening of the fingers. The arms and links are mounted in a carriage block 87 which includes spaced guide rollers 88 which ride against the guides 83 and 84. This forms a carriage for supporting and guiding the arms and links as they move in the inverted L-shaped guide from the position shown in solid line at the left-hand side of FIG. 7 to the position generally shown in dotted line at the right-hand side of FIG. 7.

When the carriage begins to move along the horizontal portion of the guide, the edge of the carrier rides out of slot 81 and could be dislodged from the fingers since slot 82 terminates to allow lateral movement. Means in the form of a spring loaded movable back wall are provided to permit the carriage to pass by in its upward travel and which thereafter engages and guides the carrier as it is moved sideways. During its motion upward, the carriage strikes the bevelled edge of the wall section 80, FIG. 6, to pivot it outwardly and allow the carriage to pass. When the carriage reaches the end of its upward travel, it clears the wall which is urged inwardly and holds the carrier against the front wall as the carriage and carrier move laterally. This holds the carrier in alignment and prevents dislodging from the fingers.

In operation during a pickup operation, the motor 65 is turned on and the chain belts are rotated to a position where the fingers 78 and 79 are opposite the enlarged portions 91 and 92 (FIG. 7) of their guide grooves, at which time further travel of the pin downwardly causes the links to rotate and spread the fingers apart. With the fingers spread apart, they can travel over the ears 93 and 94 formed on carriers. With continued movement, the pin moves upwardly along its guide slot and the links rotate to bring the fingers together with the ears 96 and 97 engaged in the notches 93 and 99 formed on the side of the carrier. The upper edges 101 and 102 of the fingers are under the rollers 103, 104 which aligns the ears with notches 98 and 99 as they close. The fingers are then guided in their guiding slots 81 and 82 and the carriage block 87 moves upwardly to the upper end of the vertical slot portion to the point 107 wherein further movement causes the drive link to drive the complete assembly to the right, as viewed in FIG. 7, still being guided by the carriage block 87 to the end of the horizontal portion 108 of the slot 72. Continued movement then causes the links 76 and 77 to rotate and the fingers to move outwardly to release the carrier. Thereafter, the carrier is laid onto the longitudinal conveyor belts 27. The motor is reversed to again close the fingers and return the pickup assembly to the pickup position over the bins whereby the next selected carrier may be picked up and delivered to the belts 27.

Referring to FIGS. 8 and 9, the carrier is delivered between the front and rear covers 111 and 112 of mechanism 113 which is adapted to rotate and lay the carriers on the belts 27. The rotate mechanism is rotated from the position shown in solid line in FIG. 9 to the position shown generally in dotted line in the same figure by means of a motor 114 which drives worm gear 115 which engages the worm wheel gear 116 to rotate the complete assembly counter-clockwise as viewed in FIG. 9. As the assembly rotates, the spaced idler wheels 117 and 118 are in continuous engagement with the carrier and as the complete assembly moves to the position shown in dotted line in FIG. 9, these wheels press the carrier 121 against the longitudinal belts 27 whereby the belts draw the carrier from the pocket formed between the covers 111, 112 and deliver the same to the transition mechanism. Spaced backup idlers 122 and 123 are positioned opposite the idler wheels. Thereafter, the motor 114 is reversed and the mechanism is brought back into alignment to receive the next carrier.

The mechanism just described assures that the carriers are placed flat on the belt and that the carrier leaves substantially in alignment with the belts for movement to the ends of the longitudinal belt into the transition mechanism 41.

Figure 6:
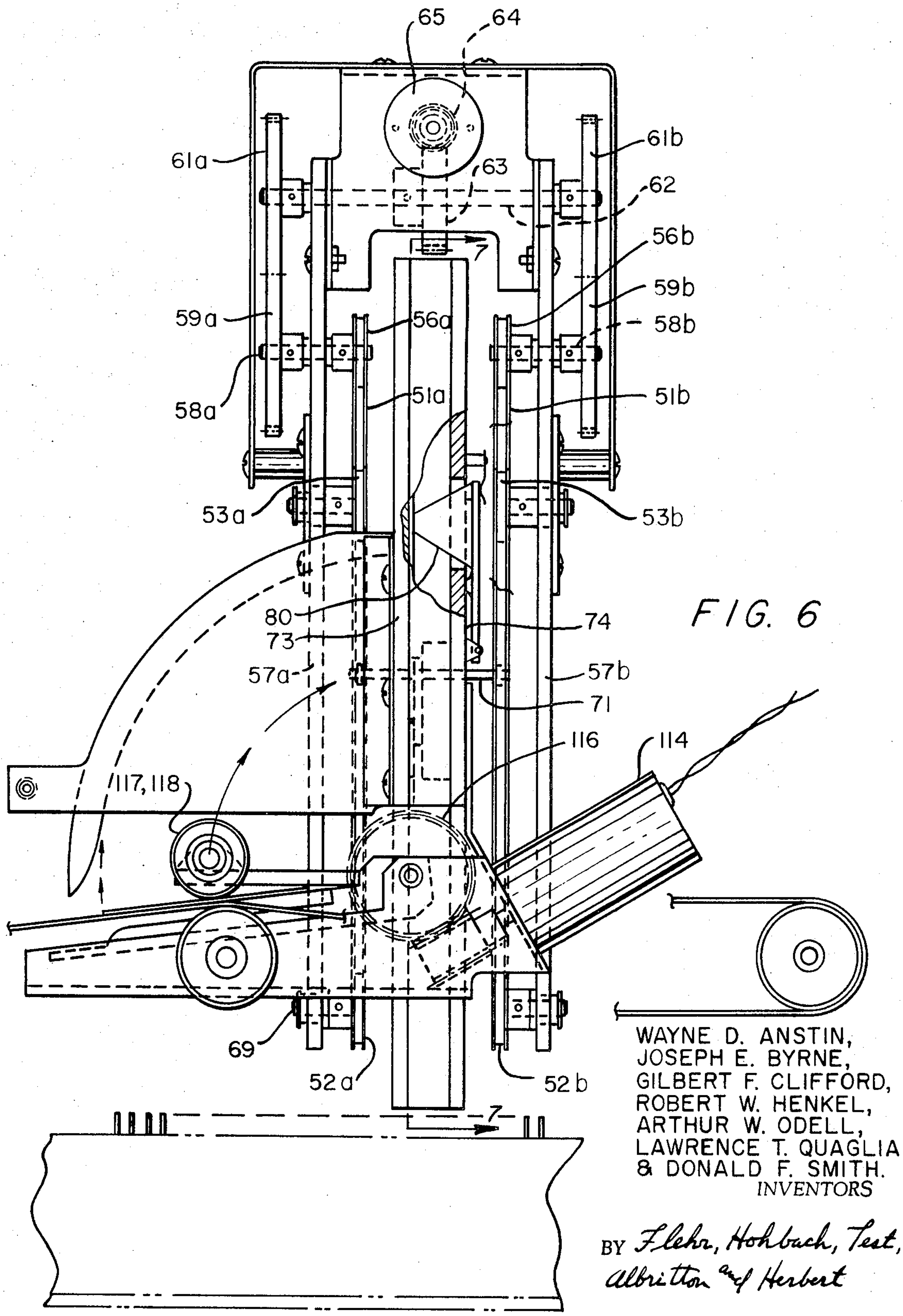
FIG. 6 is an elevational view taken along the line 6—6 of FIG. 5.
Figure 7:
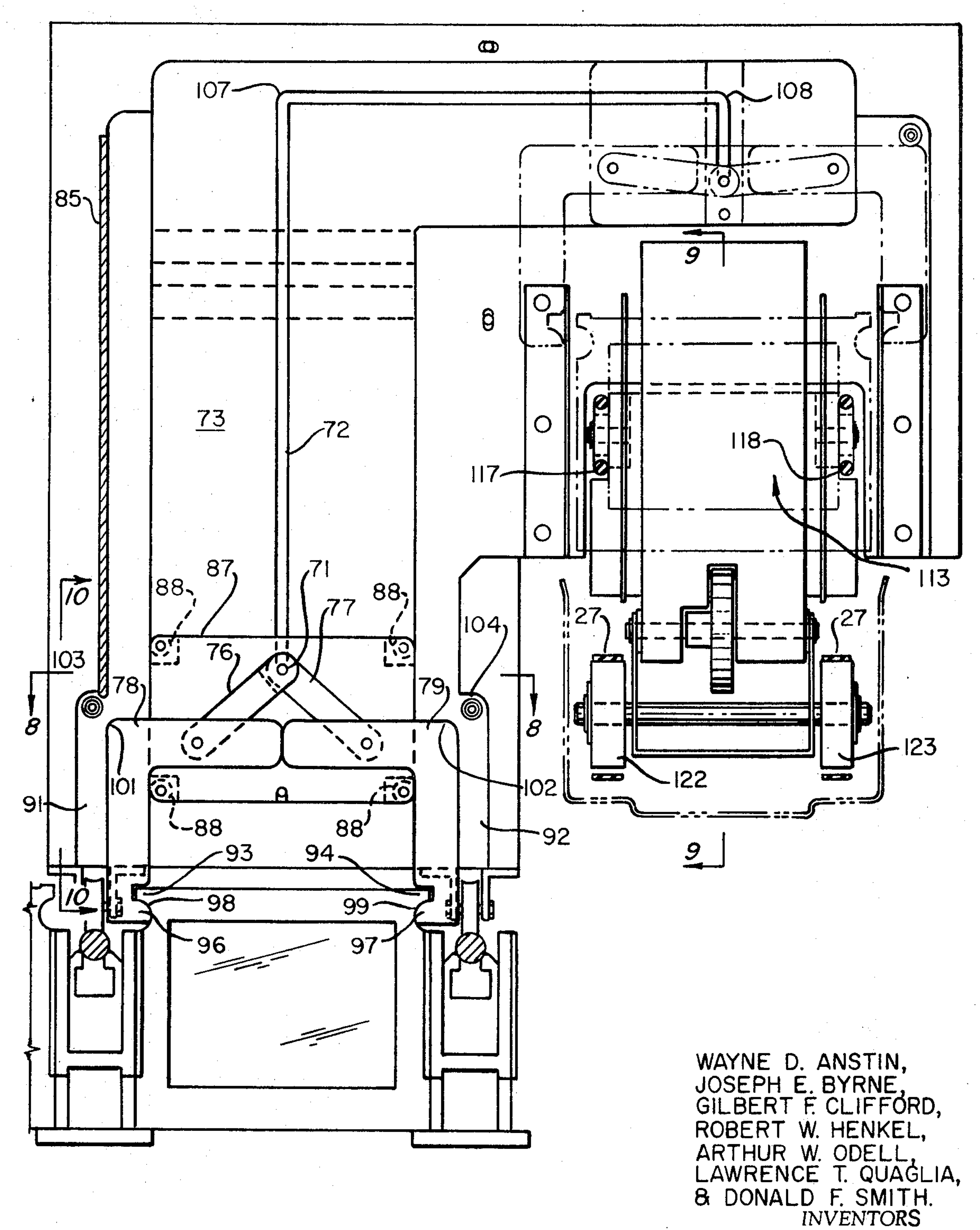
FIG. 7 is a sectional view taken along the line 7—7 of FIG. 6.

During refile, the direction of rotation of the conveyor belts 27 is reversed and the rotating mechanism is in its lowered position as shown in solid line in FIG. 6. The carrier travelling along the belt is then lifted by the belt upwardly between the idler wheels 117 and 118 into the pocket formed between the covers. Thereafter, the motor is energized and the complete mechanism is raised to the position shown in solid line, FIGS. 7 and 9. The chain drive is energized, the fingers are brought into position adjacent the carrier, the motor 65 is operated to lift the links to thereby close the fingers to engage the notches on the side of the carrier, the carrier is then lifted, translated to the left as viewed in FIG. 7 downwardly until it is inserted in an empty bin slot. Further travel causes the links to rotate and retract the fingers to release the carrier in position in the bin.

Thus, the retrieve and refile mechanism serves to select carriers one at a time from the bins and delivers them to the conveyor belts or to receive the carriers one at a time from the conveyor belt and place them in bin slots.

Carrier Transition Mechanism

Figures 11, 12, 13:
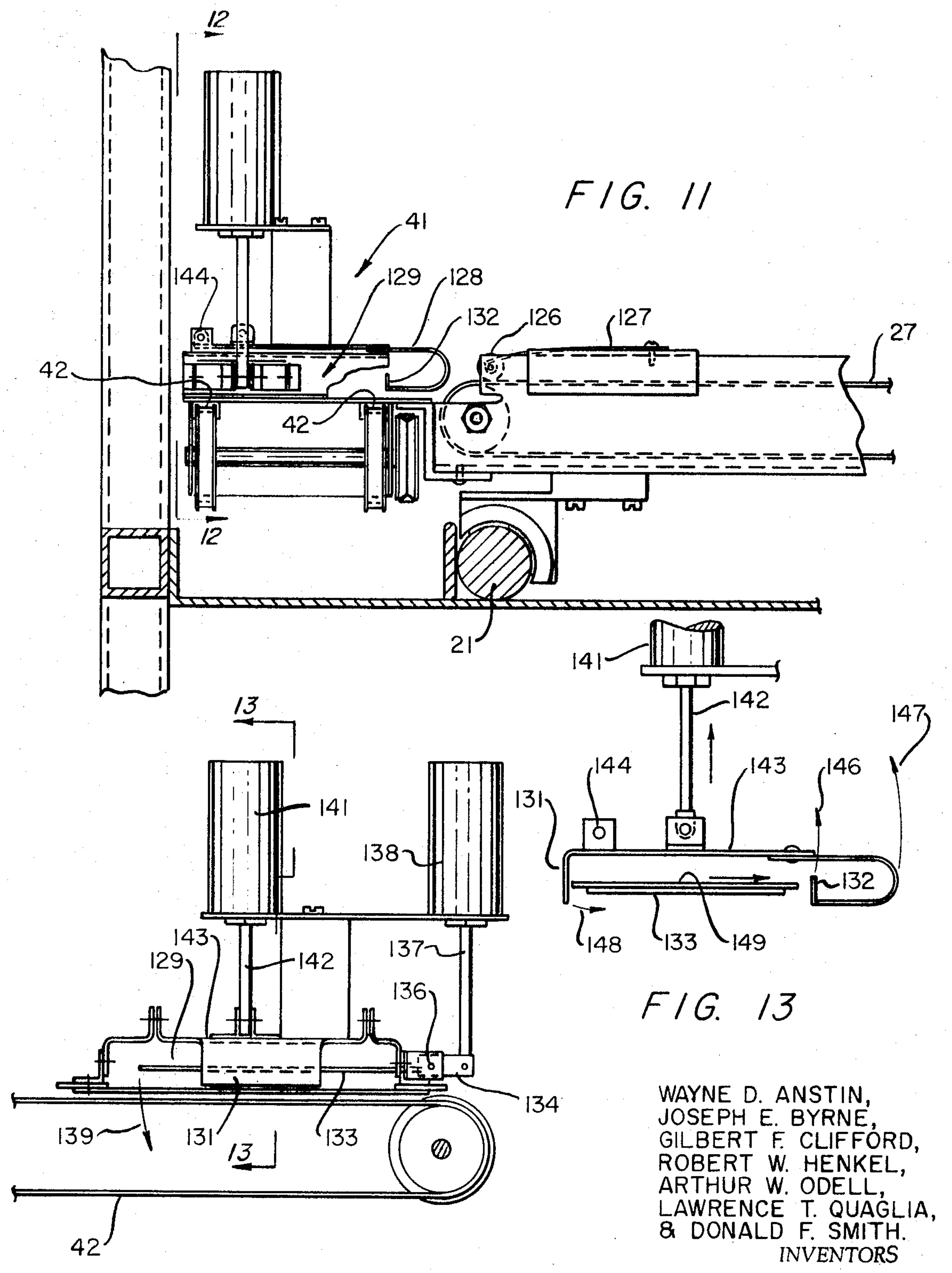
FIG. 11 is a side elevational view of the transition mechanism for transferring the carriers from the longitudinal to a transverse belt.
FIG. 12 is a sectional view taken along the line 12—12 of FIG. 11.
FIG. 13 is a sectional view taken along the line 13—13 of FIG. 12.

The carrier transition mechanism 41 is shown in FIGS. 11, 12 and 13. The mechanism receives the carriers from the longitudinal conveyor belts 27 and lowers and places the carriers onto the cross conveyor 42 for transport of the carriers to the uprighting mechanism 43. A roller 126 is disposed near the end of the longitudinal belts 27. The roller 126 is mounted at the end of a leaf spring 127 which urges the roller downwardly against the surface of the belt. The roller serves to urge the carrier against the belt to increase the friction between the rotating belt and the carrier whereby the carrier is projected forward into the transition mechanism 41. The carrier engages the front surface of the curved guide 128 lifting the guide which allows the carrier to travel into the space 129 and abut the stop 131. To prevent the carrier from bouncing out of the transition mechanism, the front stop surface 132 is provided on the curved guide. The carrier comes to rest upon the platform 133.

The platform 133 is narrower than the space between the parallel transverse belts 42 and is mounted on arm 134 pivoted at 136 and engaged by the solenoid actuator 137 of solenoid 138. When the solenoid 138 is energized, the platform 133 moves in the direction shown by arrow 139 and is lowered between the belts thereby depositing the carrier on the transverse belts. The carrier is then moved along the transverse conveyor belts 42 to the uprighting mechanism 43.

In the refile mode, the direction of travel of the transverse conveyor belt is reversed and a carrier is returned from the uprighting station 43 to the transition mechanism 41. The solenoid 138 is energized lowering the platform 133 whereby the returning carrier then rides up on the platform. Thereafter, the solenoid is deenergized and the platform is lifted to the position shown in FIG. 12. The carrier is then removed from the space 129 by means of a solenoid 141 which acts through solenoid actuator 142 attached to the guide support plate 143. The plate is pivoted at the point 144. When the solenoid 141 is energized, it lifts the spring guide 128 and the platform 143 as indicated by the arrows 146 and 147. At the same time, the stop 131 is rotated as shown by the arrow 148. The lifting of the guide out of the way of the carrier 149 and the simultaneous striking of the rear edge of the carrier 149 by the stop 131 projects the carrier forwardly onto the longitudinal conveyor belts 27 whose direction has been reversed. The carrier is then engaged between the roller 126 and the belt and travels along the belt to return to the refile mechanism previously described.

Uprighting Mechanism

Figure 14:
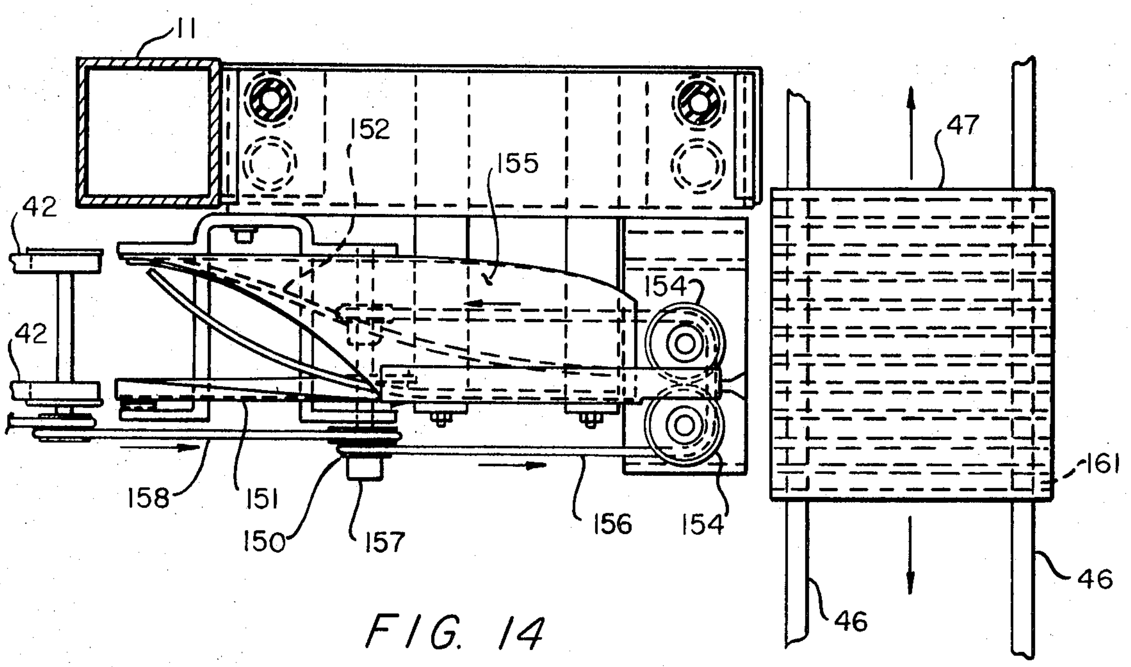
FIG. 14 is a plan view of the erecting mechanism for erecting the carriers and inserting same into the display storage unit.
Figure 15:
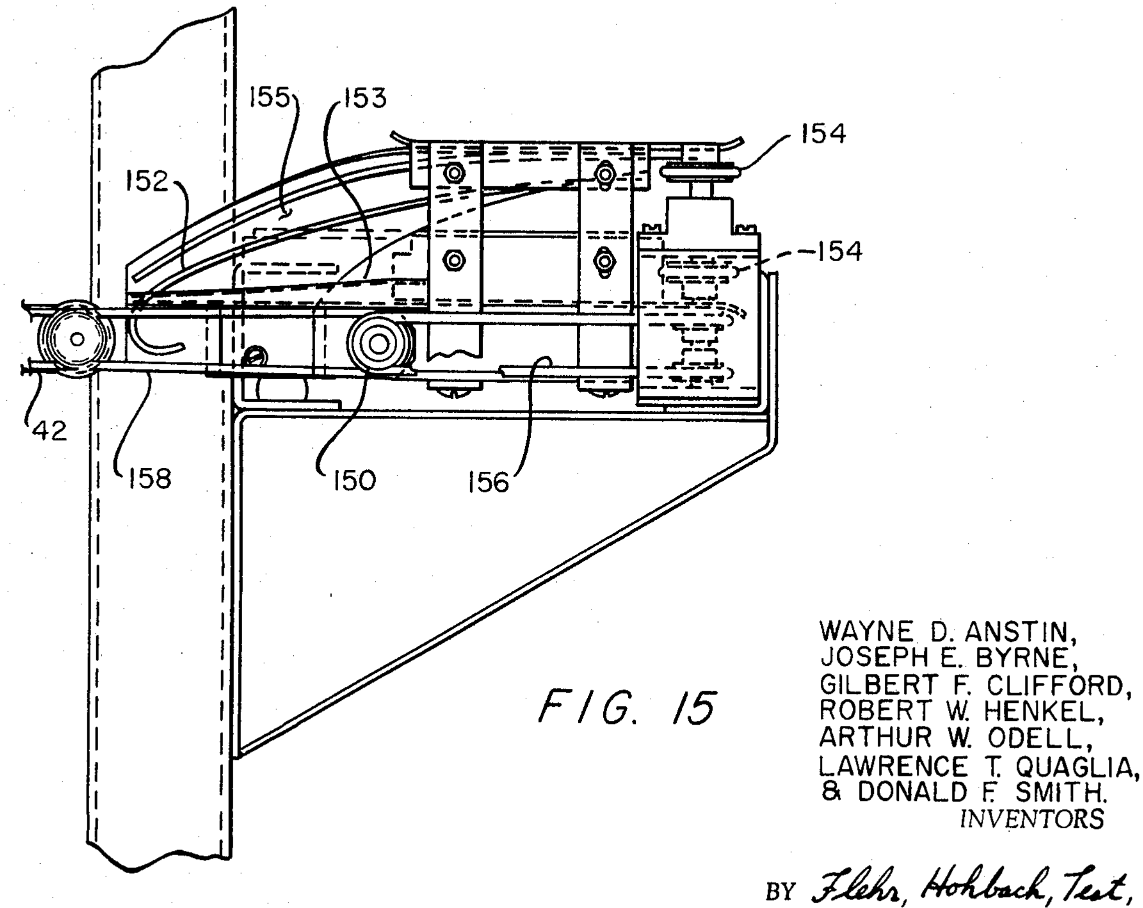
FIG. 15 is a side view of the erecting mechanism shown in FIG. 14.

FIGS. 14 and 15 show the uprighting mechanism 43 which receives the carriers from the cross conveyor 42 and places them in an upstanding position for insertion into the output magazine. The carrier which is propelled along the conveyors 42 rides into the front of the uprighting mechanism with one edge in a U-shaped guide 151. As the carrier moves forward, the opposite edge rides on a cam surface which is in the form of a bent wire 152 and is lifted upwardly. The U-shaped guide is twisted at 153 whereby the carrier can continue to rotate upwardly until it is in its upright position opposite rollers 154. A curved cover 155 is provided to retain the carriers as they rotate. The rollers 154 are driven by continuous belt 156 which, in turn, is driven from a shaft 157 and associated pulley 150 driven from the cross conveyors drive by the O-ring belt 158. The carrier is moved into the associated output magazine 47 by the spaced rollers 154. The storage bin is mounted upon belts 46 which are stepped to present sequential slots 161 to the rollers whereby the carriers are sequentially stored in the storage unit shuttle 47.

In the refile mode, the carriers are pushed out of the storage unit 47, as will be presently described, and between the rollers 154. With the direction of rotation reversed, the carriers are then projected backwardly with one edge in the guide means 151, and the opposite resting upon the cam surface 152. The carrier is then laid onto the associated conveyors 42 for return to the transition mechanism 41.

Output Station

Figure 16:
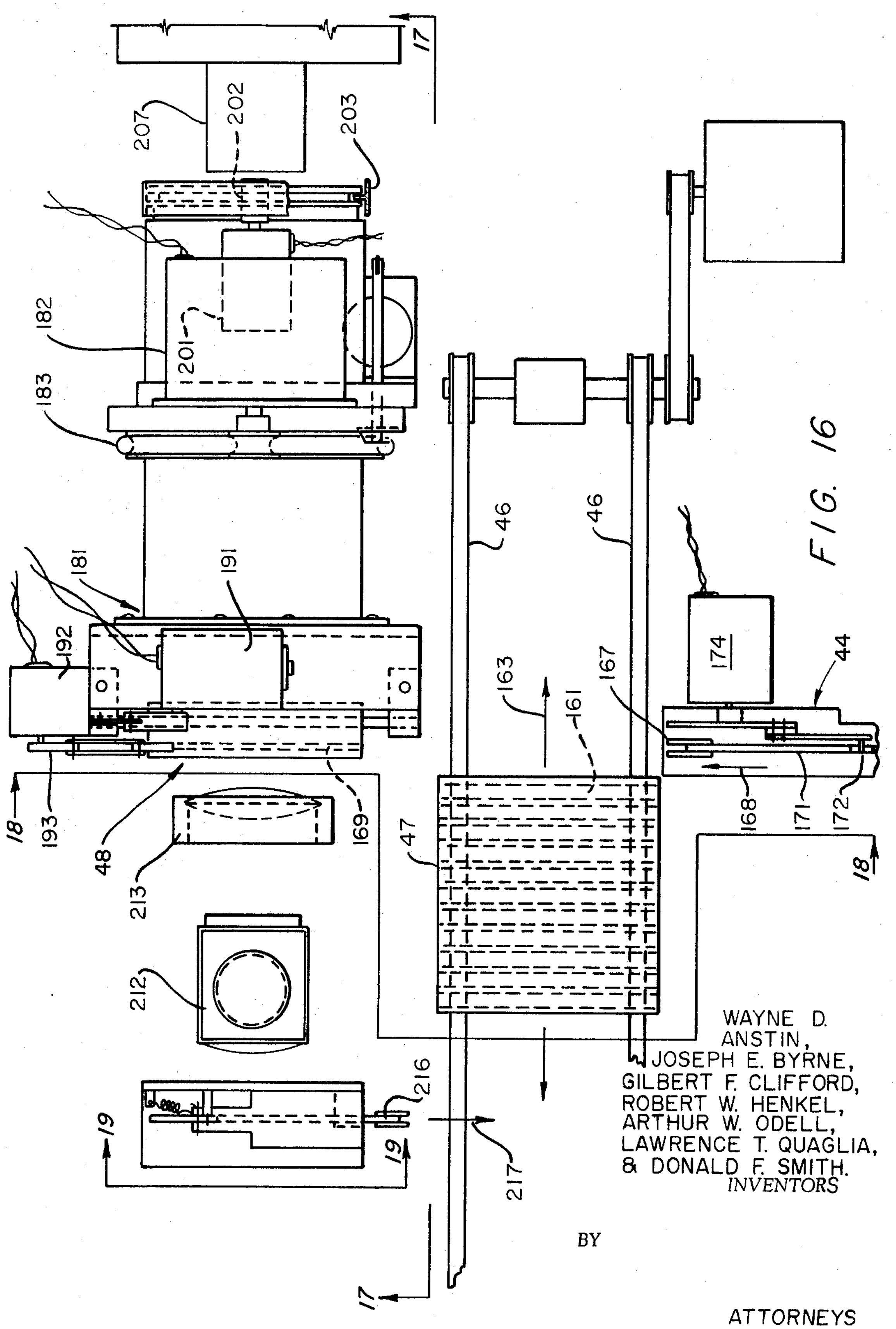
FIG. 16 is a plan view of the display storage unit and display device for viewing the carriers.
Figure 17:
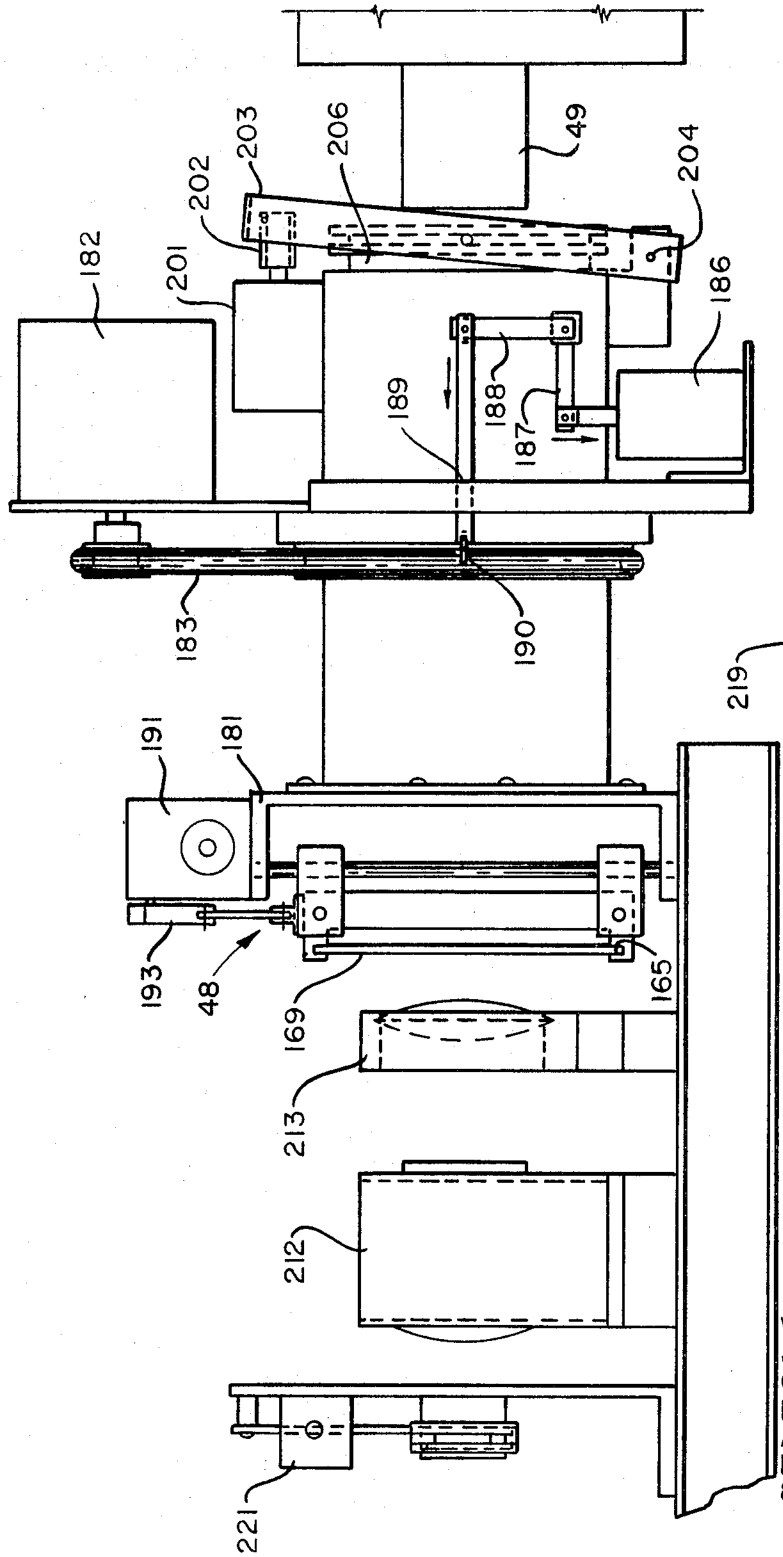
FIG. 17 is a sectional view taken along the line 17—17 of FIG. 16.
Figure 18:
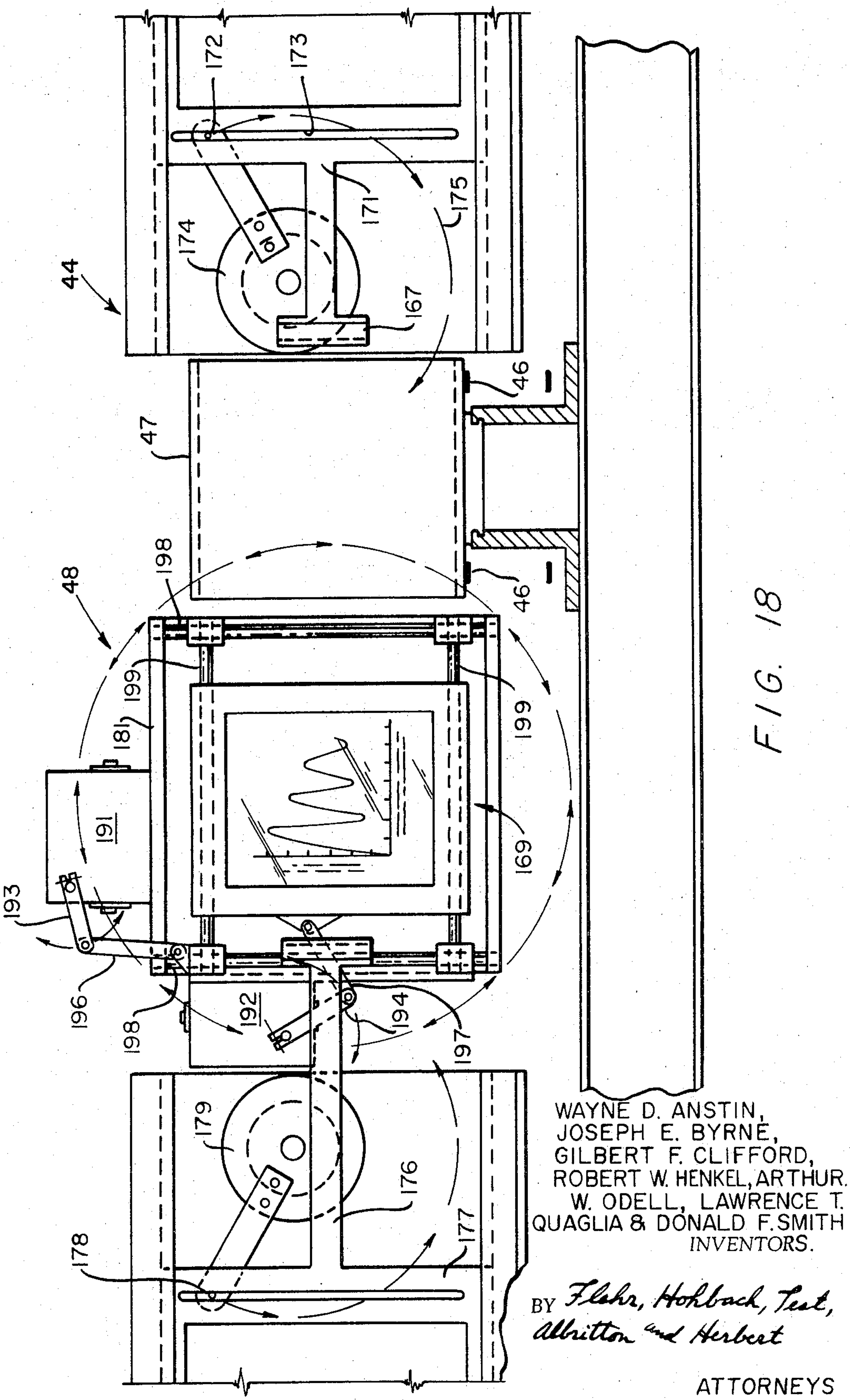
FIG. 18 shows the mechanism for moving carriers out of and into the display storage unit.

The output station is shown in FIGS. 16–19. The carriers are stored in the storage unit 47 which is moved in the direction of the arrow 163 to a position where one of the individual slots 161 lies opposite the slot 165 in the carrier hold mechanism. The carrier is then pushed out of the storage bin 161 by an arm 167 (in the eject mechanism 44) which is moved in the direction of the arrow 168. The carrier is held in the viewing mechanism as shown at 169. Referring more particularly to FIG. 18, the arm 167 is part of slide 171 which is driven by means of pin 172 riding in the slot 173. The pin is caused to move along the slot in a circular motion by a motor 174, as indicated by the arrow 175, to thereby project and retract the arm 167 to move a carrier forward into the viewing mechanism. The carriers are returned to the storage bin 47 by means of a second movable arm 176 which is mounted on slide 177 moved by pin 178 which is rotated by means of a motor 179.

After a carrier has been placed in the hold mechanism 48, viewed, copied or the like, it is moved back into the storage unit 47. The storage unit is then moved forward by means of the associated belts so that the next storage slot is opposite the arms 167, 176 for projection into the holder and for removal therefrom after the carrier has been viewed, copied or the like.

The carrier positioning mechanism to be described is rotatably mounted in a support member 181, FIGS. 16 and 17 driven by motor 182 through belt 183. Rotation of the assembly will place the carrier with the microfilm or microfiche in the proper orientation. Means are provided for locking the carrier positioning mechanism. Referring to FIG. 17, the locking means comprises a solenoid 186 which moves links 187, 188 to position the lock 189 to engage locking tab 190.

In order to view a particular portion of the microfilm, that is, for example, in a microfiche one document, there are provided means for moving the carrier holder 166 in a horizontal and vertical direction. Such means comprise a vertical drive motor 191 and horizontal drive motor 192 which, in turn, drive arms 193 and 194, FIGS. 16 and 18, which move associated links 196, 197 to move the holder in the spaced guides 198 and 199 in the X-Y direction.

The viewing mechanism includes a lens focusing motor 201, FIGS. 16 and 17, which drives a worm drive 202 which engages a lever means 203 pivoted at 204 to move the lens assembly 206 into and out of the rotatable mechanism to focus the associated lens on the document.

A television camera 49 is placed in front of the lens and views the document through the lens system. Light source 212 is provided for projecting light through a lens 213 onto the microfilm whereby the same is properly illuminated for viewing by the camera.

Figure 19:
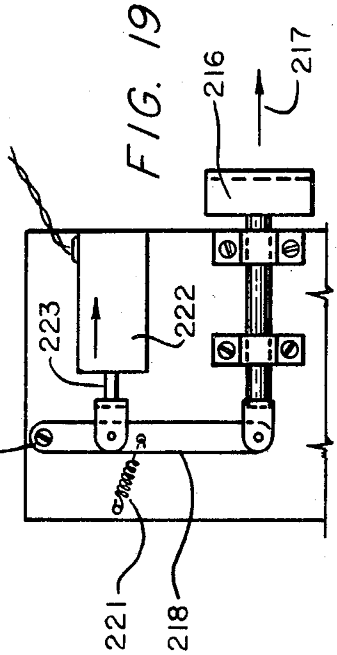
FIG. 19 is an elevational view of the return pusher mechanism taken along the line 19—19 of FIG. 16.

After the one or more carriers stored in the storage means 47 have been viewed and returned to the storage means, the storage means is returned to a position opposite the uprighting mechanism. At this point, an arm 216, FIGS. 16 and 19, is caused to move in the direction of the arrow 217 to move the carrier into the uprighting mechanism whereby it travels outwardly and is laid down upon cross conveyor 42. The arm 216 is attached to lever 218 pivoted at 219 and held in its retracted position by spring 221. Solenoid 222 acts through actuator 223 to move the arm outwardly to move a carrier into the uprighting mechanism.

Bridge Drive

Figure 21:
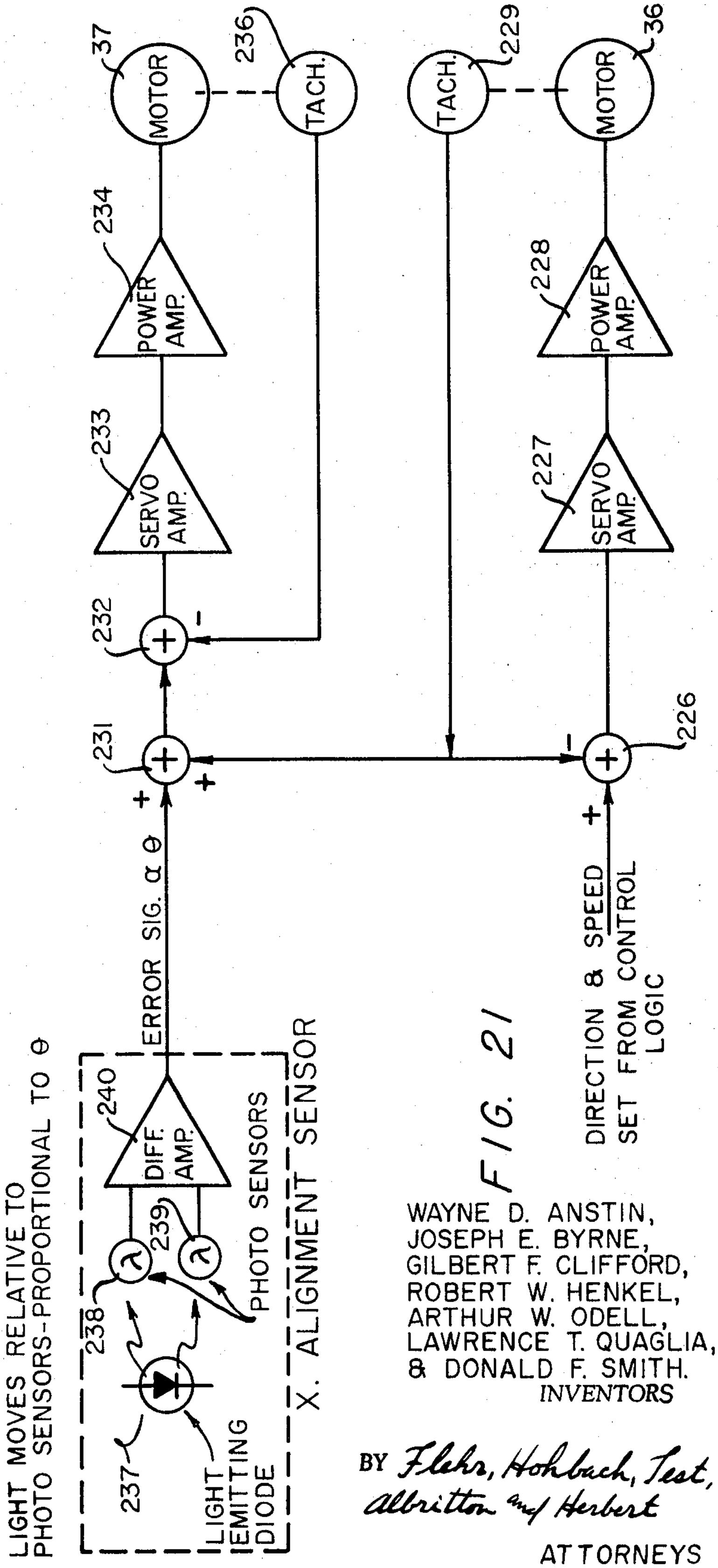
FIG. 21 is a schematic diagram of the bridge drive and control.

The motors 36 and 37 which drive the bridge through the cables 33 and 34 are controlled so as to assure that the bridge does not skew due to wear of parts, slippage of drives and the like. Referring to FIG. 21, there is shown a block diagram of the control for the bridge drive. The input command signals from the main controller are applied to a summing circuit 226 whose output is applied to servo-amplifier 227 and power amplifier 228 which applies power to drive motor 36. A tachometer 229 generates a feedback signal which is applied to summing circuit 226 and serves to cause the motor 36 to run at a constant speed. The signal from the tachometer is applied to summing circuit 231 where it is combined with a skew signal, to be presently described, and then to another summing network 232 whose output is applied to servo amplifier 233. The output of the servo-amplifier is applied to motor 37 via a power amplifier 234. Tachometer 236 provides a feedback signal to summing network 232 and the motor 37 runs at a constant speed slaved to the master motor 36. The apparatus includes means for developing an error signal for application to summing circuit 231 to speed up or slow down the slave motor so that the bridge travels across the apparatus without skew.

X-Drive Alignment Sensor

The skew sensor consists of a light source 237 fixed permanently on one X-drive bridge supports and two photosensors 238, 239 fixed on the bridge directly above the light. A differential amplifier amplifier 240 receives the signals and provides an error signal. If one support lags or leads the other, the light is moved and illuminates one sensor more than the other and an error signal from the differential amplifier is generated. This, in turn, causes the slave motor 37 to speed up or slow down until the skew is removed. When the light is directly between the photosensors, their outputs are equal and no error signal is developed by the differential amplifier. This condition corresponds to perfect alignment of the bridge over the bins.

Controller

Figure 20:
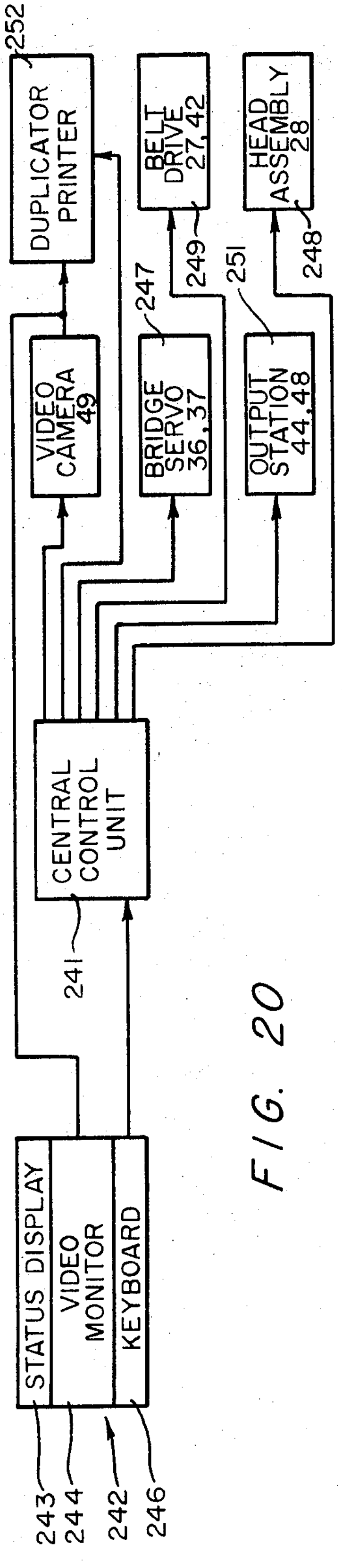
FIG. 20 is a schematic diagram showing the control system for controlling operation of the system responsive to requests.

FIG. 20 is a schematic block diagram showing the control system for controlling operation of the apparatus to locate, display, copy and refile responsive to command inputs at a remote location.

The central control unit CCU 241 is a programmable digital controller. The unit monitors and initiates all electromechanical operations in the apparatus. The unit controls all communication between the apparatus and remote terminals 242, receiving and processing all requests from the operators of the terminals and reporting operational status back to the terminals where it is displayed as a status display 243.

The following sequence is typical for the sequence of operation to retrieve a microfiche in the storage bins 14 for subsequent viewing on a video monitor 244 at the remote terminal 242.

The operator at the remote terminal enters the code number of the requested document on the terminal keyboard 246 and then depresses a "call" button. On initiation of the call, the code entered on the keyboard is transmitted as digital data to the CCU. The CCU, upon receiving the data, determines the approximate location of the document in the data bank, i.e., the bin number is calculated from the code number. The CCU then instructs the logic in the bridge servo system 247 to move the bridge 17 to the desired bin. When the bridge is over the selected bin, the CCU is advised that the apparatus is ready for the next sequence. The CCU then transfers the requested document code to the head assembly control logic 248 and instructs it to move the search and refile head 28 out over the bin 14 and read the carrier identifier until a comparison is made. The search and refile head, on finding the correct carrier identifier, will automatically stop the retrieve mechanism over the desired carrier and signal the CCU that it is ready for the next sequence. If a carrier identifier comparison is not made in the bin, the control logic will reset the search and refile head and signal the CCU that no comparison was made. The CCU can then reinitiate the search for a second try or inform the operator that the document was not found. If a comparison is made, the CCU transfers to the belt control logic 249 the belt direction data and instructs the output station control logic to prepare to receive a carrier. The CCU then instructs the search and refile head 28 to retrieve the selected carrier. Upon receipt of the belt data, the control logic starts the belts 27, 42 in the correct direction and sets the transition plate in the correct mode to move a document into the camera view station. The search and refile head then picks up the document and places it on the conveyor belt 27. The CCU is signalled upon the documents arrival at the output location. The CCU then instructs the output station control logic 251 to place the document in front of the camera and instructs the video select logic to connect the camera video output to the terminal's video monitor and, if required, signals the duplicator printer logic 252.

Upon completion of viewing or copying, the operator of the remote terminal will depress the "refile" pushbutton. The central controller, upon receipt of the refile command, will issue commands to the output station logic and the control logic essentially in reverse of the sequence for retrieval and allow the document to be returned to its bin.

We claim:

1. A document carrier storage and retrieval system comprising a plurality of elongated storage bins adapted to store document carriers, said bins disposed in side-by-side relationship, a bridge adapted to span lengthwise the storage bins, means for supporting said bridge for movement across said storage bins to span a selected bin, a head assembly adapted to move lengthwise along said bridge, conveyor means carried by and movable with said bridge for conveying carriers lengthwise along the bridge, said head assembly including carrier pick-up and refile means for removing carriers from said selected bin and delivering them to said conveyor means or for receiving carriers from said conveyor means and filing them in said selected bin.

2. A document carrier storage and retrieval system as in claim 1 including an output location and additional conveyor means for receiving carriers from said bridge conveyor and delivering them to said output location or returning them to said bridge conveyor.

3. A document carrier storage and retrieval system as in claim 2 wherein said additional conveyor means transports carriers transversely across said bins to the output location and means are provided at the end of said bridge conveyor for receiving said carriers therefrom and delivering them to the transverse conveyor or for receiving carriers from said transverse conveyor and delivering them to said bridge conveyor.

4. A document carrier storage and retrieval system as in claim 3 wherein said output location includes means for temporarily storing one or more of said document carriers.

5. A document carrier storage and retrieval system as in claim 4 wherein said temporary storage means stores the carriers in a vertical position and wherein means cooperate with the carriers leaving the transverse conveyor to turn them into a vertical position.

6. A document carrier storage and retrieval system as in claim 4 wherein said output location includes means for viewing the documents on a carrier and means for receiving a carrier from the temporary storage means and presenting them to the viewing means.

7. A document carrier storage and retrieval system as in claim 6 wherein said means for receiving said document carriers can be moved in linear directions perpendicular to one another and rotated to thereby present a predetermined portion of the carrier at a predetermined orientation to said viewing means.

8. A document carrier storage and retrieval system as in claim 6 wherein a lens is provided between the viewing means and the carrier document and means are provided for moving the lens to focus the viewing means onto the document.

9. A document carrier storage and retrieval system as in claim 8 wherein said viewing means comprises a video camera.

10. A document carrier storage and retrieval system as in claim 1 wherein said carrier pickup and refile means includes spaced fingers for holding the edges of said carriers, carriage means for supporting said fingers, and means for guiding said carriage to move the fingers over a predetermined path to move the carriers between the bin and the means for placing the carriers on the bridge conveyor.

11. A document carrier storage and retrieval system as in claim 10 including means for holding the carriers in said fingers as the carriers are moved between the bins and placing means.

12. A document carrier storage system as in claim 11 wherein said predetermined path extends vertically and horizontally.

13. A document carrier as in claim 12 wherein said holding means includes an elongated slot serving to hold the carriers as they are moved vertically and a movable wall serving to guide the carriers when they move horizontally.

14. A document carrier storage and retrieval system as in claim 1 wherein said carriers include a notched code and said head assembly includes means for reading the notched code to select a desired carrier.

15. A document carrier storage and retrieval system as in claim 1 wherein rails are disposed between adjacent bins and said head assembly includes means for supporting and guiding the head on said rails whereby it travels along a selected bin.

16. A document carrier storage and retrieval system as in claim 15 wherein said bridge includes a rail portion adapted to receive said head as the bridge moves from bin to bin and adapted to cooperate with the bin rails of a selected bin whereby the head can move along the bin rails.

17. A document carrier storage and retrieval system as in claim 1 including servo motor drive means for separately driving each end of said bridge, one of said servo motor drive means being responsive to control signals for driving said bridge and the other of said servo motor drive means being responsive to driving by the one whereby it is slaved to said one.

18. A document carrier storage and retrieval system as in claim 17 including means on said bridge for deriving a skew signal and applying it to means for controlling said other servo motor drive to control the speed of said motor drive to maintain the bridge in alignment.

19. A document carrier and storage retrieval system comprising a frame, a plurality of elongated carrier storage bins supported in side-by-side relationship on said frame, a bridge adapted to bridge said storage bins lengthwise, track means adjacent each end of said storage bins, means for supporting said bridge on said track means whereby the bridge can travel across said bins to bridge a selected bin, a head assembly associated with said bridge, said head assembly adapted to move along said bridge and in cooperation with the selected bin, conveyor means carried by and movable with said bridge to convey carriers therealong, retrieve and refile means on said head assembly serving to pick up a selected carrier from a bin and deposit the carrier on the conveyor or for removing a carrier from the conveyor and reinserting it in the bin, an output station, and means for applying carriers from said conveyor to said output station.

20. A document carrier storage and retrieval system as in claim 19 wherein said output station includes means for receiving individual carriers and presenting them for viewing by an associated viewing means.

21. A document carrier storage and retrieval system as in claim 20 wherein said output station includes viewing means.

22. A document carrier storage and retrieval system as in claim 20 wherein said means for receiving individual carriers can be moved in linear directions perpendicular to one another and rotated thereby to present a predetermined portion of a carrier at a predetermined orientation to said viewing means.

23. A document carrier storage and retrieval system as in claim 19 wherein said means for conveying carriers to said output station includes a cross conveyor adapted to receive carriers from the bridge conveyor and a temporary storage means adapted to receive carriers from the cross conveyor and temporarily store them for cooperation with said viewing means.

24. A document carrier storage and retrieval system comprising a plurality of elongated carrier storage bins disposed in side-by-side relationship, a bridge adapted to span individual storage bins lengthwise, means for supporting said bridge across said storage bins to span a selected bin, a head assembly associated with said storage bins to move lengthwise therealong, conveyor means carried for movement with said bridge to convey the carriers therealong, said head assembly including a pickup and refile means for removing carriers from said bins and delivering them to said conveyor or for removing them from the conveyor and filing them in the storage bins, an output station, conveyor means cooperating with said longitudinal conveyor for delivering carriers from and to said conveyor and to and from said output location, temporary storage means at the output location adapted to receive one or more carriers and temporarily store the carrier, a display station including a video camera and means for supporting individual carriers, means for inserting carriers from said temporary storage means into said carrier holding means for viewing by said video camera, means associated with said carrier holding means for rotating the same and translating the same to thereby present a predetermined portion of the document carried by the carrier at a predetermined orientation to the viewing means.

25. A document carrier storage and retrieval system as in claim 24 wherein said display station includes additionally a lens means and means for moving said lens for focusing the video camera on said carriers.

26. A document carrier storage and retrieval system as in claim 24 including servo motor drive means for separately driving each end of said bridge, one of said servo motor drive means being responsive to control signals for driving said bridge and the other of said servo motor drive means being responsive to driving by the one whereby it is slaved to said one.

27. A document carrier storage and retrieval system as in claim 26 including means on said bridge for deriving a skew signal and applying it to means for controlling said other servo motor drive to control the speed of said motor drive to maintain the bridge in alignment.

* * * * *